United States Patent
Miyachi

[11] Patent Number: 5,906,167
[45] Date of Patent: May 25, 1999

[54] METHOD AND APPARATUS FOR PLANTING NET TAPE RUNNERS

[75] Inventor: Yoshifumi Miyachi, Hiroshima-ken, Japan

[73] Assignee: Sanyo Turf Co., Ltd., Hiroshima-ken, Japan

[21] Appl. No.: 08/665,295

[22] Filed: Jun. 17, 1996

[30] Foreign Application Priority Data

Jul. 6, 1995 [JP] Japan ................................. 7-204969
Oct. 27, 1995 [JP] Japan ................................. 7-315723

[51] Int. Cl.⁶ .................................................. A01C 7/00
[52] U.S. Cl. ............................ 111/200; 111/900; 111/901
[58] Field of Search .................................. 111/199, 200, 111/900, 901; 47/56; 172/518, 579, 599, 612

[56] References Cited

U.S. PATENT DOCUMENTS

| | | | |
|---|---|---|---|
| 3,945,330 | 3/1976 | Leavitt et al. ......................... | 111/200 |
| 4,023,506 | 5/1977 | Robey .................................... | 111/1 |
| 4,092,936 | 6/1978 | Griffin et al. ......................... | 111/199 |
| 4,283,880 | 8/1981 | Fjeldsa .................................. | 47/56 |
| 4,866,879 | 9/1989 | Wood et al. ......................... | 111/199 X |
| 4,982,526 | 1/1991 | Miyachi .................................. | 47/56 |
| 5,165,351 | 11/1992 | Billings ................................. | 111/199 |
| 5,189,833 | 3/1993 | Clark ..................................... | 47/56 |
| 5,199,215 | 4/1993 | Lopez .................................... | 47/56 |
| 5,205,068 | 4/1993 | Solomou ............................... | 47/56 |
| 5,417,010 | 5/1995 | Ecer ...................................... | 47/56 |
| 5,525,012 | 6/1996 | Casimaty et al. .................... | 111/901 X |
| 5,526,759 | 6/1996 | Cox ....................................... | 111/199 X |

FOREIGN PATENT DOCUMENTS 116988 9/1957 New Zealand.

*Primary Examiner*—Victor Batson
*Attorney, Agent, or Firm*—Oliff & Berridge, PLC

[57] ABSTRACT

A method and an apparatus for planting runners enabling efficient and economical plantation of runners of summer lawngrass in a lawn of winter lawngrass. A plurality of longitudinal and parallel grooves having small width are formed in a ground surface and a runner net tape, prepared by dispersing runners between a pair of nets, is supplied to each groove. The net tape is forced into the ground from its central portion so that the net tape is buried in the grooves in twofold form. The net tape may also be dipped in water or a liquid for post-planting care before it is supplied to the groove.

9 Claims, 5 Drawing Sheets

METHOD AND APPARATUS FOR PLANTING NET TAPE RUNNERS

BACKGROUND OF THE INVENTION

1. Field of the Invention

This invention relates to a method and apparatus for efficiently and economically planting rootstocks or runners of lawngrass or grass into grooves made in a ground surface. The rootstocks or runners are laid in turf or in a grass field in order to envigorate grass growth and improve the appearance of the turf or grass field.

2. Description of Prior Art

It has recently become strongly desirable to maintain a green surface for a lawn (especially for a golf course lawn) and to maintain the green surface in both summer and winter to allow enjoyment of the lawn (especially the golf course lawn) throughout the year. Therefore, it is customary to plant lawngrass growing in the summer (summer lawngrass) and lawngrass growing in the winter (winter lawngrass) in an overlying manner. This practice is called overseeding. More specifically, summer lawngrass is planted as a base in a portion of ground, and the seeds of winter lawngrass are sown over the summer lawngrass.

Summer lawngrass is employed as the base since it is of the vegetative-propagation type and has no seed. Propogation of summer lawngrass can only be achieved by planting its rootstocks or runners. However, the planting of its rootstocks or runners in a lawn is a very difficult job which could only be done successfully through mannual labor. By contrast, winter lawngrass propagates from seeds, and can easily be planted in a lawn by simply sowing its seeds.

Overseeding makes it possible for a lawn to maintain its green surface even in the summer since the summer lawngrass in the base will grow when the winter lawngrass dies from summer heat. Winter lawngrass is "dead", or in a dormant state, for only about 70 days in a year and maintains green leaves for the remainder of the year continuing for as long as nearly 300 days. Therefore, the summer lawngrass base has to grow under suppression of the winter lawngrass for a long period of growing time. As a result, the summer lawngrass is often defeated by the winter lawngrass and disappears. Thus, it is necessary to plant runners (turf seedlings) of summer lawngrass into ground that has a base of winter lawngrass. This process has been considered difficult to carry out mechanically, and has only been able to be done through use of manual labor.

SUMMARY OF THE INVENTION

Under these circumstances, it is a principal object of this invention to enable the runners of summer lawngrass to be planted in winter lawngrass efficiently, economically and effectively so that the summer lawngrass firmly roots into the winter lawngrass.

The above object is attained by a method which includes forming longitudinal grooves having a small width in a ground surface, supplying to each of the grooves a runner net tape prepared by dispersing runners between a pair of nets, and forcing the net tape into the ground from its central portion so that the net tape is buried in the groove in a twofold form.

The net tape is preferably treated with water or cultivating liquid for post-planting care by dipping the net tape in the water or the cultivating liquid before (preferably immediately before) the net tape is supplied to the longitudinal groove in the ground.

The runner net tape is usually forced into the groove until the end of the two-folded tape reaches the bottom of the groove. However, it may sometimes be unnecessary or undesirable to do so, depending on the kind of runners to be planted, or the season in which they are planted, or if it is necessary to ensure the presence of oxygen in the ground. The tape may be wholly buried in the groove or partly buried therein so that a part of the tape appears on the surface of the ground.

An apparatus of the present invention which can carry out the above-mentioned method will now be described. The apparatus for planting runners in groove formed in the ground comprises a mechanism for forming longitudinal grooves having a small width in a ground surface. A second mechanism forces a runner net tape into each of the grooves. The runner net tape is prepared by dispersing runners between a pair of nets. A third mechanism utilizes rotatable disks to hold and guide a central portion of the net tape into the groove so that the net tape is buried in the groove in a twofold form.

The apparatus preferably further includes a tank containing water or a cultivating liquid, so that each tape may be dipped therein before it is supplied to one of the disks.

A variety of devices can be used as the mechanism for forming each groove. The mechanism must be able to form a continuous groove having a width which is sufficiently large to receive a runner net tape therein. Thus, it is possible to use, for example, a device in the form of a circular saw, a device having a plurality of blades on either side of a disk, a device having a plurality of rotary blades directed toward the circumference of a disk, other rotary cutting device, or a narrow spade.

Both the mechanism for forming the grooves and the second mechanism for forcing a runner net tape into each groove comprise a plurality of devices juxtaposed at right angles to the longitudinal grooves to be formed so that it may be possible to form a plurality of grooves simultaneously and force a plurality of net tapes simultaneously into all the grooves.

The apparatus of the present invention may be connected to a means built specifically for running the apparatus. The apparatus may also be connected to a typical piece of machinery, such as a tractor.

ADVANTAGES

The invention described above has a number of outstanding advantages as will be stated below:

(1) Plant runners of summer lawngrass are mechanically and continuously planted in a turf of winter lawngrass, and can be selectively planted in only that part or parts of the turf which have lost grass;

(2) The runners forced into the grooves in the ground are covered with fine particles of soil, elimnating the conventional and expensive use of top dressing. A reduction of cost is possible since no machine or vehicle is required for regulating the particle size of soil for top dressing or for transporting, loading or spraying the top dressing.

If the apparatus has a liquid tank, the water absorbed by the runner net tapes prevents undesirable drying of the runners. A large amount of fine particles of soil adhering to the wet surfaces of the runners protect the runners and effectively draws capillary water, enabling the active rooting and growth of the runner;

(3) Runner net tapes are placed in a plurality of appropriately spaced apart grooves, allowing a smaller amount of runners to be used than when the runners are planted with a uniform density throughout an entire tract of land;

(4) Plant runners can be planted in many different media, including; a patch of grass, an ordinary ground surface, a bank of a river, a pond, etc. A variety of plant runners can be planted in these different media when grass is planted in a lawn; and (5) The plant runners have an increased weight as a result of absorbing water and are unlikely to be affected by wind or vibration, making them easy to handle and enabling a more reliable planting operation.

DETAILED DESCRIPTION OF THE INVENTION

The present invention will be explained with reference to the attached drawings.

Figure 1:
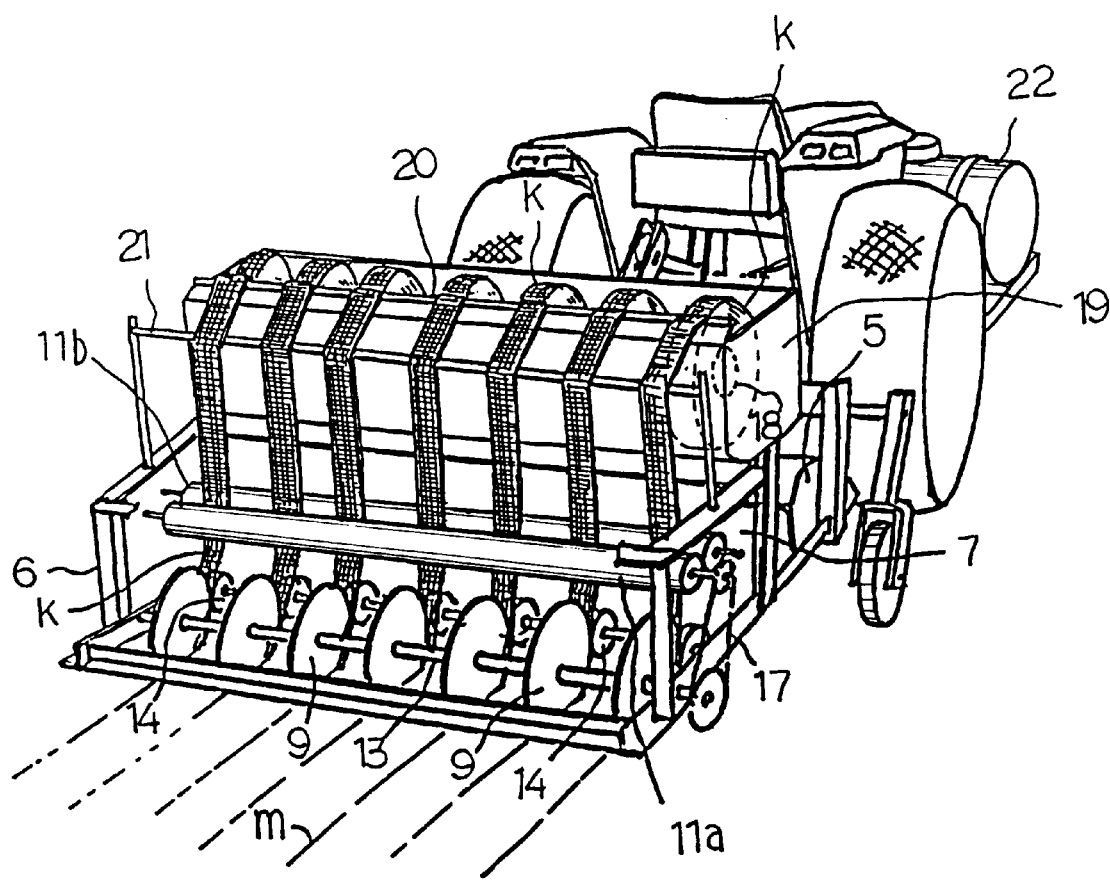
FIG. 1 is a perspective view of an apparatus in accordance with the present invention used for planting runners in a groove in the ground.
Figure 2:
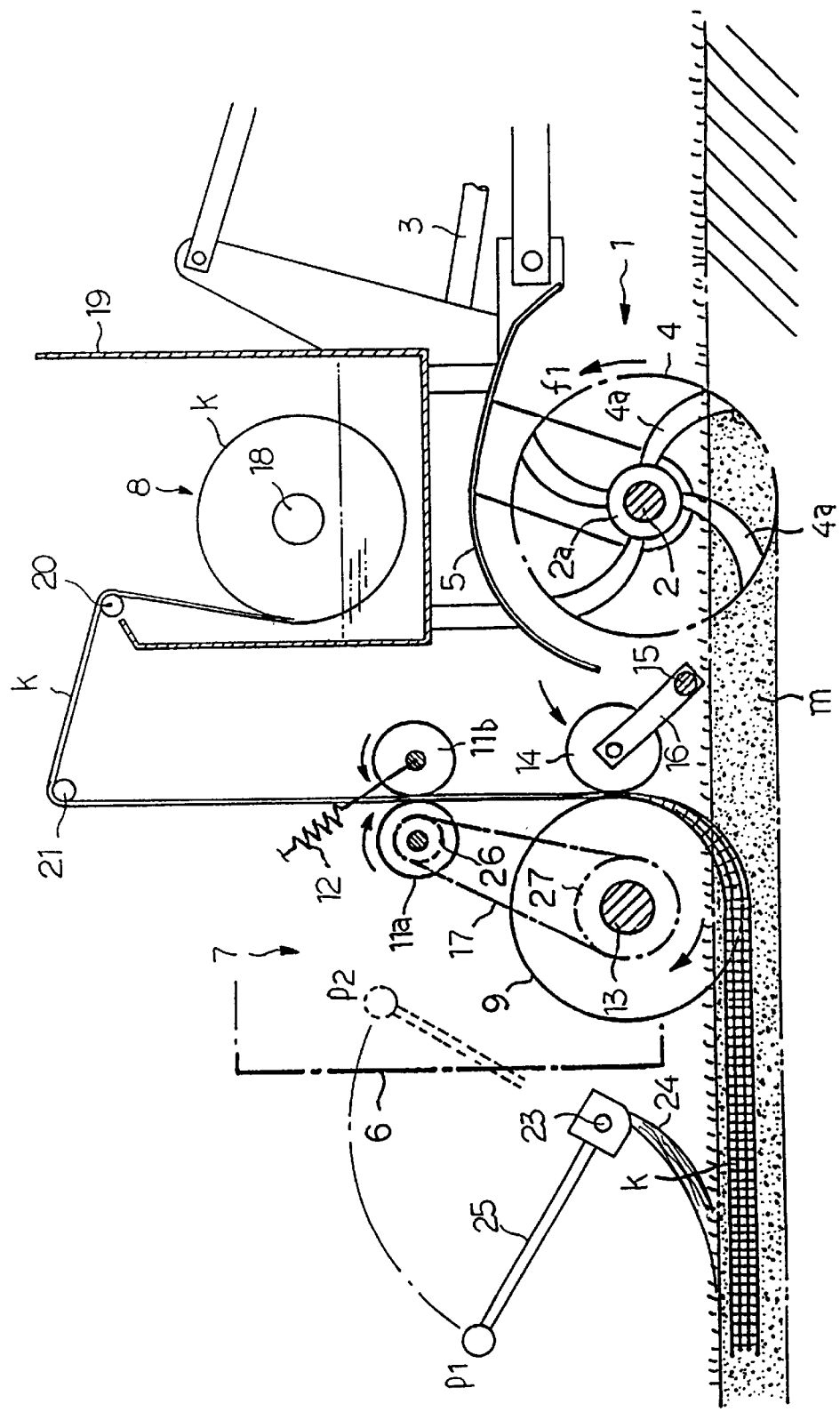
FIG. 2 is a schematic side elevational view showing the construction of the apparatus shown in FIG. 1.

FIGS. 1 and 2 depict a first embodiment of a device 1 for forming grooves in the ground. An adjustable hitch of a three-point linkage on a tractor may be used to support the device 1. A horizontal drive shaft 2 on the device 1 is rotatably driven by a PTO shaft (power-takeoff-shaft) of the tractor via a connecting shaft 3. A plurality of rotary groove cutting blade devices 4 are spaced apart along the length of shaft 2 by an equal distance of about 15 cm to 30 cm, and are rotatable in an up-cut direction f1. Each groove-cutting blade device 4 comprises a plurality of groove-cutting blades 4a bolted to a flange 2a secured to the shaft 2. The groove-cutting blade may alternatively be a circular saw. The groove-cutting blade devices 4 are provided with an arcuately curved cover 5.

A plurality of devices 7 for forcing tapes into grooves are mounted in a frame 6 secured to the device 1 for forming grooves. Each device 7 for forcing tapes into grooves comprises a device 8 for holding and guiding a runner net tape k, and a disk 9 for forcing the runner net tape k into a groove in the ground.

The holding and guiding device 8 comprises a cylindrical supporting member 18 about which a spool (or a cardboard core) of the runner net tape k wound in a roll form can be fitted, and a pair of delivery rollers 11a and 11b which are rotatably supported by bearings (not shown). The front roller 11b is urged toward the other roller 11a by a spring 12. The disks 9 are situated exactly behind the rotary groove-cutting blade devices 4, respectively, and are rotatably supported on a supporting shaft 13 supported rotatably at a predetermined position on the frame 6.

Figure 3:
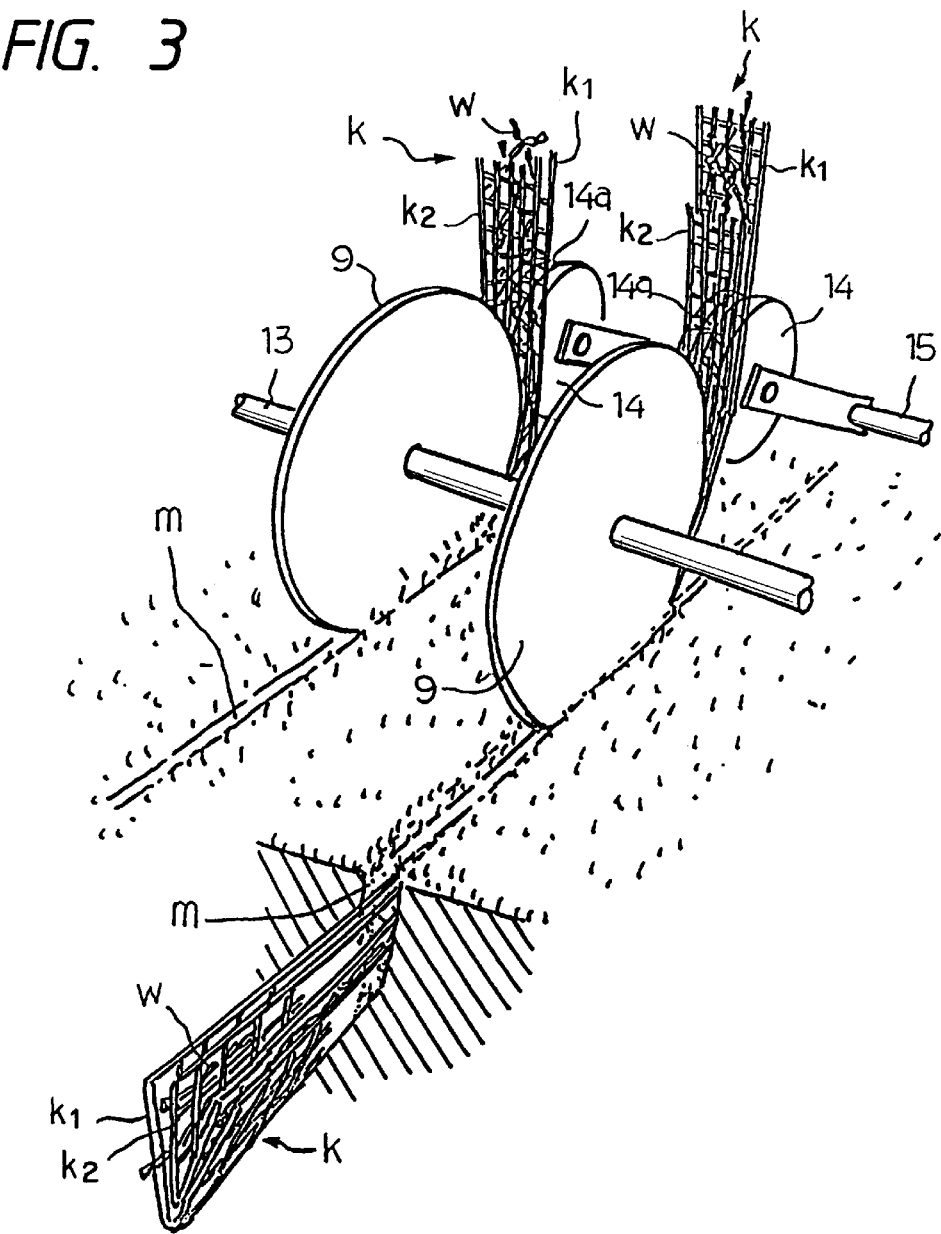
FIG. 3 is a view showing the operation of the disks used in the apparatus.

A wheel 14 is supported ahead of each disk 9. FIG. 3 depicts the disks 9 as they insert tapes in the ground. Each wheel 14 is connected by an arm 16 to a supporting shaft 15 attached to the frame 6 and is freely and swingably displaced from the shaft 15. The wheel 14 has a recessed groove 14a at its circumferential face. The wheel 14 is normally held in engagement with the disk 9 by the action of gravity or a spring such that the recessed groove 14a is fitted onto the circumferential edge of the disk 9.

The disks 9 are preferably interlocked in rotation with the roller 11a. For this interlocking movement, a chain 17 can be connected between a sprocket 26 fixed to the shaft of the roller 11a and a sprocket 27 fixed to the shaft 13 to transmit the rotation of the shaft of the roller 11a to the disks 9. There may, however, be cases in which it is more convenient for the disks 9 to be rotatable with the movement of the apparatus as a whole and independent of roller 11a.

A liquid tank is preferably situated along the route of supply of the runner net tapes k from the holding and guiding device 8 to the disks 9, so that the tapes k may be dipped in water or cultivating liquid. Referring to FIG. 2, a liquid tank 19 is mounted on the frame 6 so as to hold rolls of runner net tapes k fitted about the cylindrical supporting member 18. A guide roll 20 is provided above a top opening and inside of tank 19. A guide roll 21 is provided above the delivery roller 11b. These guide rolls 20, 21 guide the tapes k as they emerge from the tank 19. A liquid reservoir 22 (see FIG. 1) is mounted on the tractor adjacent to its front end for supplying the tank 19 with the cultivating liquid when required. The top of the tank 19 may be left open, or may alternatively be closed by a removable cover having an opening to pass the tapes k.

Figure 4:
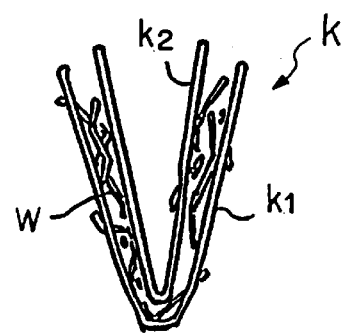
FIG. 4 is a view showing a runner net tape as it is to be configured in a groove.

Each rolled runner net tape k has a small width and a length of about 50 m to 100 m. As shown in FIGS. 3 and 4, the tape k comprises a pair of nets $k_1$ and $k_2$ with runners w dispersed therebetween.

Figure 5:
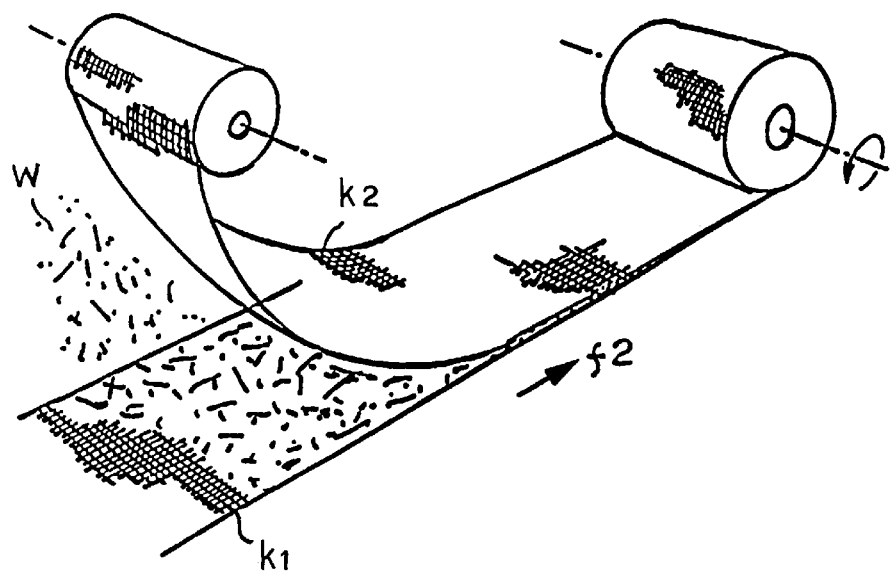
FIG. 5 is a view showing a process for the preparation of a runner net tape.

The preparation of net tapes k is shown in FIG. 5. Runners (soil-free) w of summer lawngrass are uniformly scattered on a large width net $k_1$ while it is moved in the direction of an arrow f2. A net $k_2$, also having a large width, is laid over the lower net $k_1$ so as to cover runners w. The superposed nets $k_1$ and $k_2$ are moved in the direction of the arrow f2 and wound into a roll. The roll is cut into a plurality of rolls having a small final tape width (preferably from 5 cm to 7 cm).

The original roll may be formed on an iron spool and may be cut either before it is removed from the spool, or thereafter. Alternatively, the original roll may be formed on a tubular cardboard core, and cut with it. It is also possible to use a plurality of cardboard cores which are previously cut in predetermined length (width) and are fitted about a spool, one after another. The plurality of cardboard cores having a total length substantially equal to the width of the original net which is not yet cut, are fitted about a spool. After the original net is rolled, the net is cut in accord with the length of each cardboard core.

The nets $k_1$ and $k_2$ have a mesh size (preferably 9 mm square) which allows soil to pass while retaining the runners w. The nets are formed from a material, such as yarns of staple fibers, which is easily weathered by exposure to nature. The nets $k_1$ and $k_2$ may also be replaced by sheets of paper having a similar mesh size and similar properties.

Description will now be made of a method of planting runners of summer lawngrass in a ground surface covered with winter lawngrass by employing the apparatus as described above.

Central holes in the cardboard paper cores of the runner net tapes k are loosely fitted about the cylindrical supporting member 18, so that the tapes k may be rotatable or movable. Leading ends of the net tapes k are guided past the two rollers 20 and 21 and the delivery rollers 11a and 11b toward the disks 9, and are further guided between the disks 9 and the wheels 14 to the lowest position of the disks 9, as shown in FIG. 3.

The liquid reservoir 22 is filled with water or cultivating liquid. The cultivating liquid is preferably prepared by adding materials which are useful for the budding and growth of runners w to water so that the cultivating liquid may have an added value for post-planting care, etc. The materials that can be added to water to form a cultivating liquid include a liquid fertilizer, sugar, a rooting accelerator, an anti-wilting agent, an activating agent, etc. The water or cultivating liquid is supplied from the reservoir 22 to the liquid tank 19, so that at least the lower portions of the rolls of runner net tapes k may be dipped in the liquid.

A worker rides on the tractor, places the various parts of the apparatus in operation, and advances it at a speed of approximately 2 km/h. As a result, the rotary groove cutting blade devices 4 are rotated to advance and thereby form continuous grooves m, each having a width of about 2 to 3 cm (see FIG. 3). As the blade devices 4 are rotated in the up-cut direction f1, soil is scattered forwardly of the blade devices 4. It is, therefore, possible to make the grooves efficiently.

The frictional contact of the disks 9 with the grooves m in the ground and the runner net tapes k causes the disks to rotate at a speed corresponding to the advancing speed of the tractor. The delivery rollers 11a and 11b are rotated together with the disks 9. A corrugated circumferential edge could be provided on the disks 9 to ensure a non-slip contact between the disks and the grooves m.

The runner net tapes k are drawn by the delivery rollers 11a and 11b, and fed at a speed corresponding to the advancing speed of the tractor. The excess of the liquid which the tapes k have absorbed in the tank 19 is removed from the tape k as they are squeezed when moving past the roller 20. The tapes k move down from the roller 21 and between the delivery rollers 11a and 11b, and are continuously bent in a twofold form by the recessed grooves 14a provided in the circumferential faces of the wheels 14. The bent tapes k are then pressed down by the disks 9 and forced into the grooves m in the ground.

As a result, each runner net tape k is entirely folded in two and held between the opposite walls of the groove m, as shown in FIGS. 3 and 4. The tape is covered with fine particles of soil which are produced when the groove is formed and when the tape is pressed into the groove m. No additional soil is required for filling the groove or dressing the runners.

The water or cultivating liquid which the tapes k (or the runners and nets) have absorbed while in the tank 19 prevents the runners w from drying during their plantation, thus preventing the lowering of activity or dying of the runners. Moreover, a large amount of fine particles of soil adhere to the wet runners w and the wet surfaces of the nets $k_1$ and $k_2$ to further protect the runners. The fine particles of soil that are adhered to the nets will also draw capillary water quickly from the ground to the runners.

Thus, the net tapes k improve rooting and growth of the runners w after planting as compared with tapes that are not impregnated with water or cultivating liquid. Net tapes $k_1$ and $k_2$ can be formed from cotton or like water-retaining material to further increase water-retention and prevent the runners w from drying.

The device 7 for forcing tapes into grooves may comprise a plurality of structures which are vertically movable independent of one another, and which are each adapted for working with one of the rotary groove-cutting blade devices 4. Each disk 9 may work independently to properly ensure that all the tapes k are buried to an equal depth in the grooves m, even if the ground has an uneven surface along the transverse width of the frame 6.

The apparatus may further include a brush device attached to the rear end of the frame 6, as shown in FIG. 2, for filling the grooves m with soil. More specifically, a brush 24 is swingably supported on a shaft 23 attached to the frame 6. An operating lever 25 is provided for rotating the brush 24 and is movable between its position p1 shown by solid lines when the brush is used for filling the grooves with soil, and its position p2 shown by broken lines when it is not used.

Figure 6:
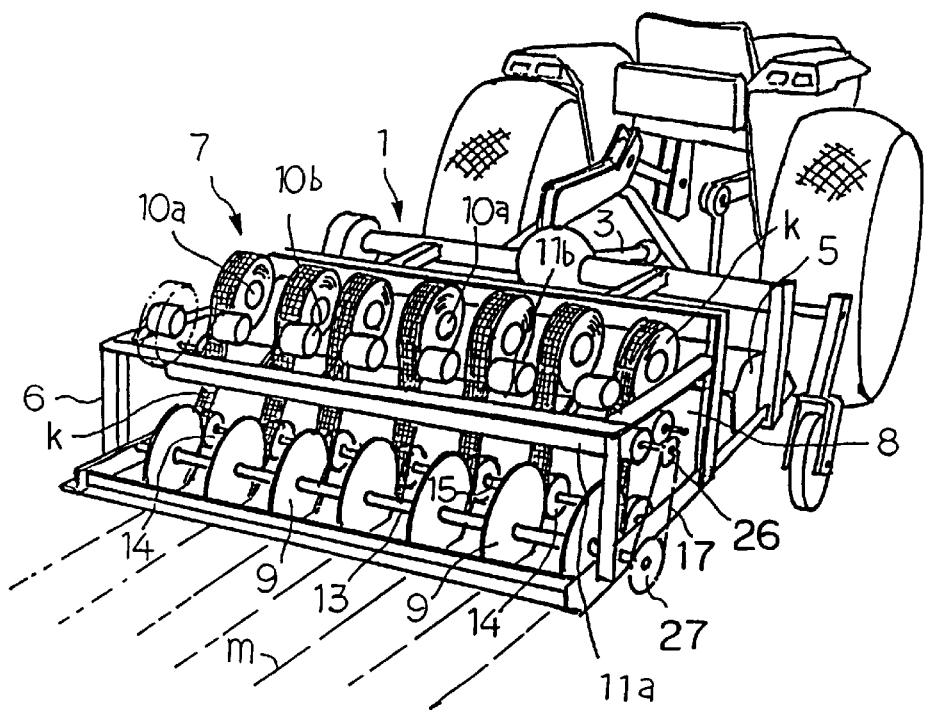
FIG. 6 is a perspective view of an apparatus accoridng to a second embodiment of the present invention.
Figure 7:
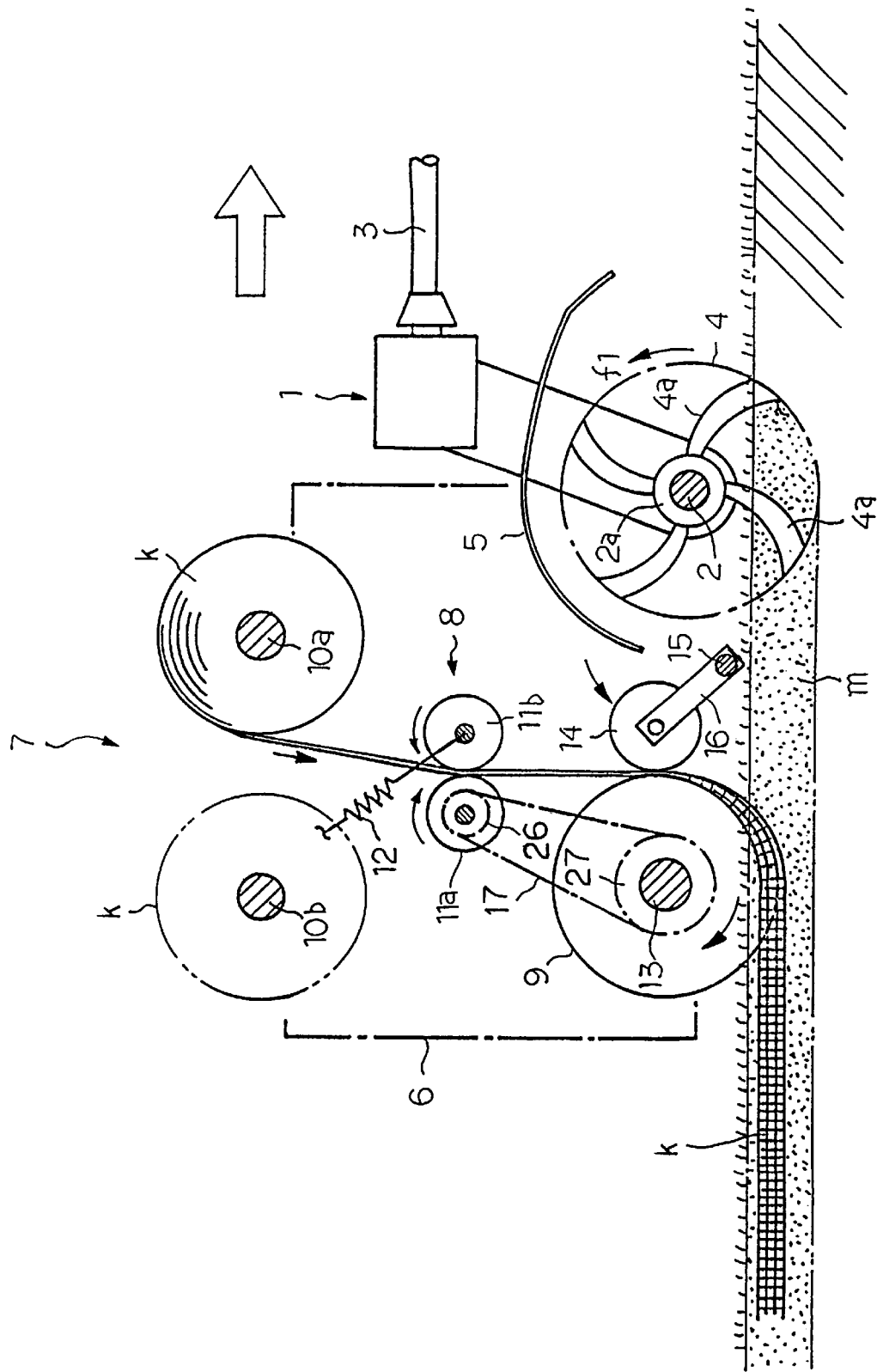
FIG. 7 is a schematic side elevational view showing the construction of the apparatus shown in FIG. 6.

FIGS. 6 and 7 show a second embodiment of the invention having no tank 19 for a cultivating liquid. The reference numerals used to describe the first embodiment are used again to denote like parts. No repeated description of those parts will be made.

The invention of the second embodiment utilizes two series of cylindrical supporting members 10a and 10b situated above the delivery rollers 11a and 11b. The supporting members 10a and 10b support rolls of runner net tapes k and are spaced apart from each other along a longitudinal axis of the apparatus. The function of the cylindrical supporting members 10a and 10b are identical in function to the cylindrical supporting member 18 in the apparatus according to the first embodiment. The presence of two series of cylindrical supporting members 10a and 10b is advantageous since the runner net tapes k can be supplied from the rolls mounted on the rear cylindrical supporting members 10b after all of the tapes k mounted on the front members 10a have been used.

The apparatus may further include a liquid reservoir 22 for holding water or cultivating liquid, so that the water or cultivating liquid may be sprayed or otherwise supplied to the rolls of runner net tapes k mounted on the cylindrical supporting members 10a and 10b.

Although the foregoing description has been made by reference to lawngrass, particularly of the vegetative-propagation type which propagates from runners (such as mascarene grass (*Zoysia tenuifolia*)), this invention is also applicable to use on other areas of land, including; a patch of grass, an ordinary ground surface, and a bank of a river, or a pond. The invention can be used for planting runners of almost all kinds of plants of the type which propagate from runners. Thus, examples of the plants to which this invention can advantageously be applied include; cogongrass and mugwort, St. Augustine and bamboo grass, flowering plants, kudzu (vine), and ivy and like woody climbing plants. When planted, the runner net tape k in each groove m is preferably buried at a depth in the range of, approximately 7 cm to 10 cm.

While this invention is useful for planting one plant that withers during one season of the year simultaneouly with another plant that propagates during that same season (summer lawngrass and winter lawngrass), it is also possible to utilize this invention for planting lawngrass, etc. in a tract of land having no plant growing thereon.

What is claimed is:

1. A method for planting runners comprising:

forming at least one longitudinal groove in a ground surface, continuously supplying to said at least one groove a runner net tape prepared by dispersing runners between a pair of nets, and forcing the net tape continuously into the ground from a central portion of the net tape so that the net tape is buried in the groove in a twofold form.

2. A method for planting runners comprising:

forming at least one longitudinal groove in a ground surface, supplying to said at least one groove a runner net tape prepared by dispersing runners between a pair of nets, impregnating said net tape with a liquid for post-planting care before it is supplied to said at least one groove, and forcing the net tape into the ground from a central portion of the net tape so that the net tape is buried in the groove in a twofold form.

3. A method for planting runners as claimed in claim 1, wherein a plurality of grooves are formed in the ground surface, and said plurality of grooves are spaced apart from one another by a distance of about 15 cm to 30 cm, and said net tape has a width of about 5 cm to 7 cm and is buried at a depth of about 2 cm to 4 cm from the ground surface.

4. A planting apparatus for planting runners comprising:

a frame, means associated with the frame for forming at least one longitudinal groove in a ground surface, a means associated with the frame for holding and guiding a continuous runner net tape prepared by dispersing runners between a pair of nets, and a means associated with the frame for continuously forcing a continuously supplied net tape into the ground, comprising at least one rotary disk rotatably supported at a predetermined position on the frame.

5. A planting apparatus for planting runners as claimed in claim 4, further comprising a tank in which said tape is dipped in liquid for post-planting care before it reaches said at least one rotary disk.

6. A planting apparatus for planting runners as claimed in claim 4, wherein the means for forming at least one longitudinal groove comprises a rotary groove-forming blade.

7. A planting apparatus for planting runners as claimed in claim 5, wherein the means for forming at least one longitudinal groove comprises a rotary groove-forming blade.

8. A planting apparatus for planting runners as claimed in claim 4, wherein each of said means for forming at least one groove and said means for forcing the net tape into the ground are juxtaposed transversely of the apparatus and at right angles to the direction in which said at least one groove is formed.

9. A planting apparatus for planting runners as claimed in claim 5, wherein each of said means for forming at least one groove and said means for forcing the net tape into the ground are juxtaposed transversely of the apparatus and at right angles to the direction in which said at least one groove is formed.

* * * * *